Figure 1:
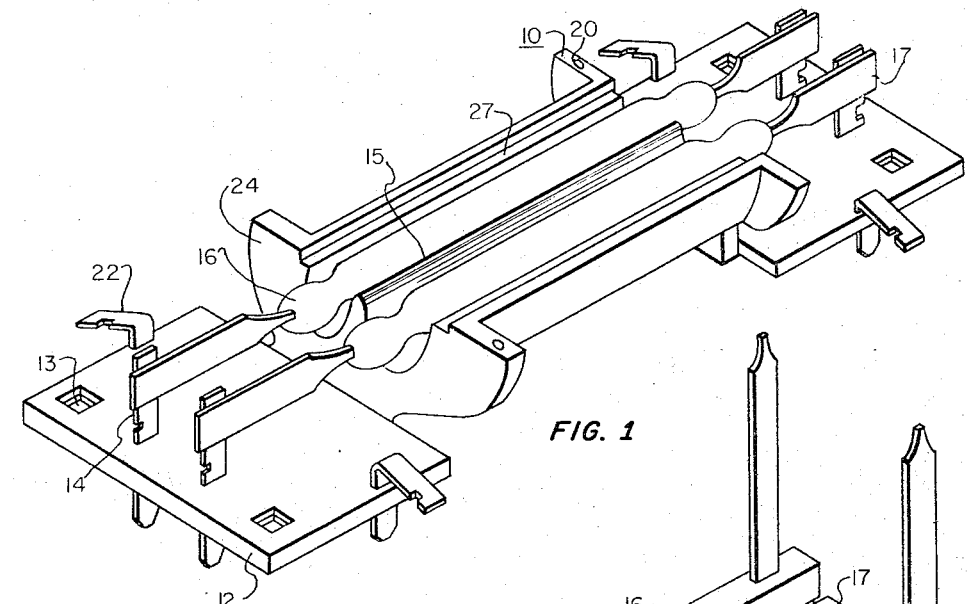
Figure 2:
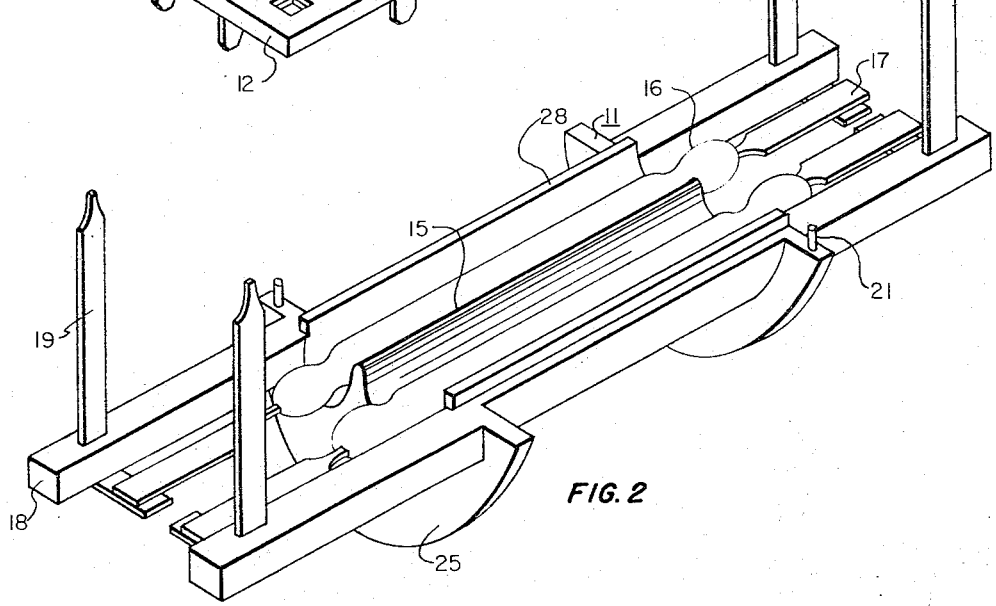
Figure 3:
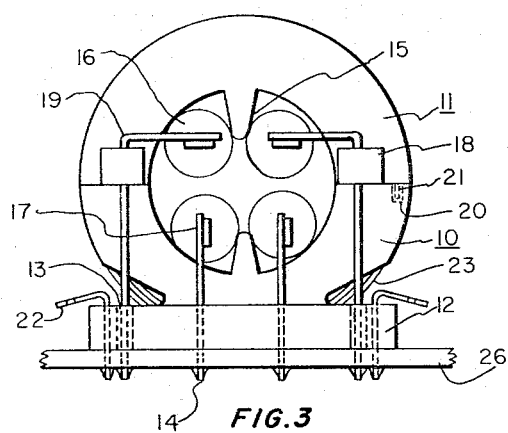

Dec. 20, 1966   R. K. ELSE ETAL   3,293,578
AXIALLY SPLIT BOBBIN WITH UPPER, AND LOWER, SEMI-CYLINDRICAL
INTERLOCKING SECTIONS FOR REED RELAYS
Filed Jan. 6, 1966

INVENTORS
ROBERT K. ELSE
ANTHONY J. WILKIS
BY
AGENT

United States Patent Office

3,292,578
Patented Dec. 20, 1966

3,292,578
ANIMAL CONTROL
Daniel M. Stout, St. Louis, Mo., assignor to Whitmire Research Laboratories, Inc., St. Louis, Mo., a corporation of Missouri
Filed Feb. 24, 1965, Ser. No. 435,046
3 Claims. (Cl. 119—1)

This invention relates to the protection of humans from the attack of vicious animals, and particularly to a means and method of arresting the onslaught of such an animal without killing, crippling, or otherwise inflicting permanent or serious injury upon it.

The animals, from whose attack the present invention affords protection, may be large or small, wild or domesticated, legged, winged, or neither, so long as their locomotory facilities equip them to attack while enveloped in air, as distinguished from a liquid or solid medium. For the purpose of this disclosure, however, such animals are typified by that symphony of contradictions, the genus Canis, species *familiaris*.

The split personality of a dog—e.g., its devotion to and trust of its master on the one hand, versus its ferocity toward and distrust of strangers on the other hand—gives rise to the need for the present invention. Although some of them seem to be endowed with a sort of instinct for distinguishing friend from foe, this trait is frequently trained or bred out of them for the protection not only of their domain, but of themselves, because too many foes have schooled themselves to fool dogs into the belief that they are friends. Although it is relatively easy to train a dog to resist the ingress into his domain of all but a few authorized persons, a dog's facilities for recognizing credentials of authorized ingressors are limited. For example, its response to the scent and sight of the familiar postman in the familiar uniform may be perfectly docile, whereas the approach of a different scent in the familiar raiment will bestir antagonistic reaction. And in the case of less frequent, if not less welcome, albeit legally authorized ingressors (such as meter readers, bill collectors, and revenuers) the dog is not impressed by the display of any badge, or other identification device of the character which usually impels ordinary mortals to open the door.

A principal object of the present invention is to provide protection for persons whose legitimate duties require their ingress into domains entrusted to the alert watchfulness of a dog, blessed with a high sense of devotion to duty.

A corollary object, which arises out of reciprocal even-after-death devotion of master to dog—not to mention the wails of organized bemoaners of cruelty to animals—is to effectively provide such protection for the ingressing human without being inhumane to the brute.

These and other objectives are accomplished by projecting a charge of foam into the face of a charging or unruly animal. The effect is essentially psychological, but may also be physiological. The foam is preferably harmless to the animal, but the surprise is adequate to distract his attention from the business of the moment, if not to send him whirling in retreat. In this connection, it is important to observe that the animals, against whose attack the present invention is primarily intended to provide protection, are usually without substantial symbolic capacity (i.e., the ability to quickly reason with a changing situation). For example, if a charging dog suddenly finds his head engulfed in a cloud of foam, delay is injected into his orientation, creating complete confusion, or otherwise obliterating his primary act or original objective.

On the other hand, especially where protection is desired against animals which may be possessed of substantial symbolic capacity (for example, Homo sapiens), it may be desirable to introduce physiological effects, and hence, under such circumstances, the foam may desirably contain mucous irritants which create instant, albeit temporary, sensation of pain upon contact with the eyes, mouth, or nose of the charging animal, and thereby either induce mental confusion which disorients the animal's immediate behavior, or modifies his direction of action.

In carrying out the invention, any convenient source of foam may be utilized, but it is preferably portable, and equipped with some means for propelling the foam or foam components on a trajectory which is reasonably consistent with the range necessary to parry the attack of the animal at a safe distance from the object of the attack. The foam may be generated by chemical means, or by mechanical means, or by both. Any of the techniques heretofore employed in generating foam for smothering fires, "whipping" cream, topping confections, making lather, etc., may be utilized if provision is made for propelling it (or its components) as aforesaid. A convenient form of foam generator is an ordinary aerosol container—of the type employed for packing and dispensing "whipped" cream, shaving lather, cake icing, bird repellant, rat bait, and the like—constructed to withstand higher internal pressure than is the case for the conventional uses aforesaid, and charged with a suitable combination of ingredients which, when released through the conventional foam nozzle of such a container, yield a thick glob of fine foam within a distance of about four to six feet from the nozzle. Any of the conventional foam nozzles obtainable from such manufacturers as Clayton Valve Manufacturing Co., St. Louis, Missouri, and Avoset Company, Oakland, California, may be utilized, but the nozzle is preferably constructed and proportioned to shoot a relatively straight stream for about four to six feet and be easily and quickly aimable. Moreover, the valve for controlling discharge through the nozzle is preferably one whose manipulator is universally triggerable, such as the conventional "toggle type" valve. By "universally triggerable" is meant a valve whose opening involves neither complexity of motion, nor particularity in the radial direction of the manipulation force. This is desirable because when one is fending off the charge of a vicious dog, there is no time to waste in feeling and fumbling to find a firing pin and to flip it.

Preferably, the aerosol type of container aforesaid is charged with propellent gas, which is either in the liquid state or dissolved in other liquid, but, in any event, is of a character such as to be in the gaseous state under temperature and pressure conditions which normally prevail on the exterior of the container. Various chlorinated and fluorinated hydrocarbons, or mixtures thereof, may be employed for this purpose. Preferably the gas, or mixture of gases, is one whose vapor pressure is at least about 75 p.s.i.a. at 70° F.

Suitable foam-producing ingredients are many. Generally, there is a liquid which either per se has, or by incorporation of appropriate surfactants is made to have, greater wettability toward air than toward the propellent gas, but the invention is not limited to any particular foam-producing ingredients or techniques. The choice of foam-producing ingredients is preferably such as to yield a foam having a maximum of fine, and a minimum of coarse, bubbles e.g., an average cubic inch of foam at the time of impact upon the target preferably contains at least about 500 bubbles. The components may be selected that the foam forms immediately upon release from the container, or, if desired, the formation of foam may be delayed (for the fractional part of a second) after such release so as to foam at a distance of four to six feet or more from the point of discharge. The greater the distance which the projected stream must travel before the foam forms, the greater must be the distance between the charging animal and the foam generator when the stream of components is released, and the greater the latter distance, the greater the risk of missing the charging target. The speed with which the foam develops after the mixture is released from the nozzle depends not only upon the choice of ingredients, but also upon the magnitude of the pressure differential between the outside and the inside of the container.

For the purpose of illustrating an appropriate combination of ingredients for charging a container of the type above described, the following is typical:

| | Parts by wt. |
|---|---|
| Water | 5–1,000 |
| Polyhydric alcohol | 1–10 |
| Surfactant | 2–20 |
| Propellent gas | 30–300 |

Such a combination of ingredients will yield a foam which has the desired psychological effect upon the animal; and, depending upon the species chosen within the aforesaid genera, the resulting foam may also have a physiological effect. However, the physiological effect, when wanted, is preferably obtained by the addition of an aromatic essential oil or oleo resin, such as lemon oil, lemon grass oil, wintergreen, cassia, thyme, capsicum, ginger, or the like.

More specifically, the foam-producing components of the foam generator are illustrated by the following examples:

EXAMPLE 1

| | Percent |
|---|---|
| Lauryl sulphate and other saponiss bodies | 3.150 |
| Butoxy polypropylene glycol | 1.35 |
| Propylene glycol | 0.35 |
| Water | 63.875 |
| Dichlorodifluoromethane | 30 |
| Essential oil | 1.05 |

Other polyhydric alcohols may be substituted for those named. Any of various detergent compositions or surfactants may be substituted for the lauryl sulphate. The essential oil may be any of those previously named, or others which produce a temporary sting, but have no permanent adverse effect. The dichlorodifluoromethane may be replaced by other propellent gases which are compatible with the other ingredients. For example, a mixture of monochlorodifluoromethane and trichloromonofluoromethane in the proportions of about equal parts of each may be utilized. A foam generator including the foregoing composition will maintain an internal pressure of about 70 p.s.i. gauge at 70° F.; will deliver about 20 grams per secod of the composition through a standard Clayton foam nozzle; and will project a stream in the horizontal direction with no trajectory drop that is visual to the naked eye for a distance of 5 to 6 feet, and for a distance of 14 feet wtih a trajectory drop of but 3 feet. The proportions stated in the foregoing and following examples are by weights.

EXAMPLE 2

| | Percent |
|---|---|
| Oleic acid | 14.2 |
| Isopropyl alcohol | 4.8 |
| Triethanolamine | 9.5 |
| Water | 41.5 |
| Dichlorodifluoromethane | 30 |

EXAMPLE 3

| | Percent |
|---|---|
| Sodium lauryl sarcosinate | 31.88 |
| Sodium lauryl ether sulphate | 3 |
| Triethanolamine lauryl sulphate | 5 |
| Water | 60.12 |
| Nitrous oxide or $CO_2$ | 2.48 |

EXAMPLE 4

| | Percent |
|---|---|
| Diethanolamide concentrate of coconut oil | 3.5 |
| Triethanolamine lauryl sulphate | 28 |
| Oleyl alcohol | .7 |
| Water | 41.8 |
| Dichlorodifluoromethane | 25 |

EXAMPLE 5

| | Percent |
|---|---|
| Cream (10–30% butter fat) | 97.52 |
| Carbon dioxide | 2.48 |

The carbon dioxide of this example may be replaced by nitrous oxide in equal quantity.

EXAMPLE 6

| | Percent |
|---|---|
| Cream (10–30% butter fat) | 70 |
| Dichlorodifluoromethane | 30 |

Dichlorodifluoromethane is the preferred propellent gas because it is not only compatible with the other foam-producing ingredients, but its vapor pressure of 84.9 p.s.i.a. at 70° F. is ideal for use with containers of the character above described.

The effect of the foam projectile of the present invention upon vicious dogs is illustrated by the following tests, in each of which the foam composition was compounded according to Example 1 above.

Test A—Veterinary clinic

The test was conducted upon an adult male Labrador-German Shepherd, age about 4 years, and weighing 50 to 60 pounds. The dog had bitten his master, and was in the clinic for observation. He has glassy eyes, and would approach any man without fear. It had been impossible to put a leash on him. He despised the Chief Veterinarian, and would try to bite the veterinarian whenever the latter passed his cage. The dog removed from his cage, and released in a 20 foot by 12 foot room. I (a complete stranger to the dog) entered the room with him. The dog charged me, and when it was within 5 or 6 feet, I released a charge of foam from a container, impaling a glob of it on his face. The dog stopped immediately, and concentrated his attention on wiping the foam from his face. The dog did not recharge me, but did bare his fangs when I approached him. A leash was applied without difficulty.

Test B—Dairy farm

The dogs involved in this test were trained to guard dairy property, and were known far and wide as dangerous biting dogs. As I approached the dairy property, I beheld a large white wolf-like dog and a large, solid black, half-breed of some kind standing on the road bank, barking and growling. Armed with a foam generator of the character above described, I approached the barking dogs. The dogs seemed to sense trouble, and started to back away, and I advanced toward the dairy barn and farmhouse. When the dogs were within a few feet of the dairy barn, the owner came out of his house and gave them the command to attack me. The white one charged me as commanded, and at a distance of about 6 feet from me, received a face full of foam from my foam generator. The dog turned and ran to a pickup truck near the barn, jumped through the open window, and sat there growling. As I approached the truck, the dog jumped out and ran toward his master. As I approached the dog and master, the dog put up a teeth-showing and growling act. When his master commanded the dog to attack, the dog ran away from his master and got on top of the truck cab.

The experience had no lasting physical effect on the dog, and did not diminish his usefulness as a guard dog.

Other tests have convinced me, however, that when the same person, armed with a foam generator of the same appearance (particularly color) as that which that person used on that dog, approaches the same dog within a matter of a few days after the dog's first experience, the dog voluntarily retreats. The duration of the lasting impression made on a dog by his memorable experience varies with the dog.

While the foregoing description and the tests aforesaid relate the invention to the control of dogs, it is not to be understood that the invention is limited to the control of dogs. On the other hand, it is applicable to the control of numerous animals, including, as previously indicated, Homo sapiens, where the invention is of particular advantage in the control of prisoners, mobsters, and other unruly persons, without harming them. Other orders of animals which are readily controlled by the invention are the order Perissodactyla, order Artiodactyla, order Rodentia, order Lagomorpha, order Primates, order Proboscidea, order Edentata, order Marsupialia, and order Carnivora. In the case of dogs, the invention can be utilized with advantage not only to protect human beings against the attack of dogs, but to break dogs from attacking each other, break them from barking, break them from chasing automobiles, or from jumping on, or licking, persons or objects. Of course, the foam projectile must be utilized under circumstances such that the dog's symbolic capacity relates the experience to the act from which it is desired to break him.

From the foregoing description, those skilled in the art should understand that the invention accomplishes its objects, and provides a convenient and easily-activated protection against charging dogs and other vicious animals, which may be utilized effectively without practice or training. Moreover, the foam generator of the present invention is economically produced and of long life. Consequently, it is to be distinctly understood that the invention is not limited to the details of the embodiments herein described in detail, but, on the contrary, that it extends at large to the principle of parrying the attack of an animal, or quelling its unruliness by propelling a foam projectile into its face.

Having thus described the invention, what is claimed and desired to be secured by Letters Patent is:

1. In the art of parrying the attack of an animal the process comprising: forcibly projecting harmless foam into the face of the attacking animal.

2. In the art of parrying the attack of an animal the process comprising: providing a foam generator charged with a composition which is harmless to the animal, and projecting from the generator into the face of the attacking animal a charge of material which in the course of its trajectory develops foam containing at least about 500 bubbles per average cubic inch.

3. The process of claim 2 wherein the charge of the foam generator includes water, an oleophyllic material, a surfactant, and a propellant gas whose vapor pressure is at least about 75 p.s.i.a. at 70° F., a substantial part of said gas being liquid, the water being in excess of any other component.

References Cited by the Examiner
UNITED STATES PATENTS

| 599,383 | 2/1898 | Bunnell et al. | 251—9 |
| 2,876,935 | 3/1959 | Lindberg | 239—304 |
| 2,890,817 | 6/1959 | Rheinstrom | 222—394 |
| 3,189,232 | 6/1965 | Joffe | 222—394 |

SAMUEL KOREN, *Primary Examiner.*

HUGH R. CHAMBLEE, *Examiner.*